March 26, 1940. M. J. LACHANCE 2,195,031
WEIGHING SCALE
Filed April 1, 1938

INVENTOR.
MODESTE J. LACHANCE
BY Swan, Frye Hardesty
ATTORNEYS

Patented Mar. 26, 1940

2,195,031

UNITED STATES PATENT OFFICE 2,195,031

WEIGHING SCALE

Modeste J. Lachance, Louisville, Ky., assignor to Walter F. Stimpson, Louisville, Ky.

Application April 1, 1938, Serial No. 199,493

1 Claim. (Cl. 240—2.11)

This invention relates to weighing scales, and more particularly to the provision of improved electrical switching means, automatically operable in response to loading of the scale, to control illuminating devices or other desired electrical apparatus. An important object of the invention is to provide such improved switching means which does not interfere with the operation or affect the accuracy of the scale, which is entirely enclosed within the scale housing, but provided with means accessible from outside the housing whereby it may be easily, quickly and accurately adjusted to respond to different scale loadings.

Other objects and advantages will be apparent from the following description, wherein reference is made to the accompanying drawing illustrating a preferred embodiment of the invention, and wherein similar reference numerals designate similar parts throughout the several views.

Figures 1, 2, 3, 4:
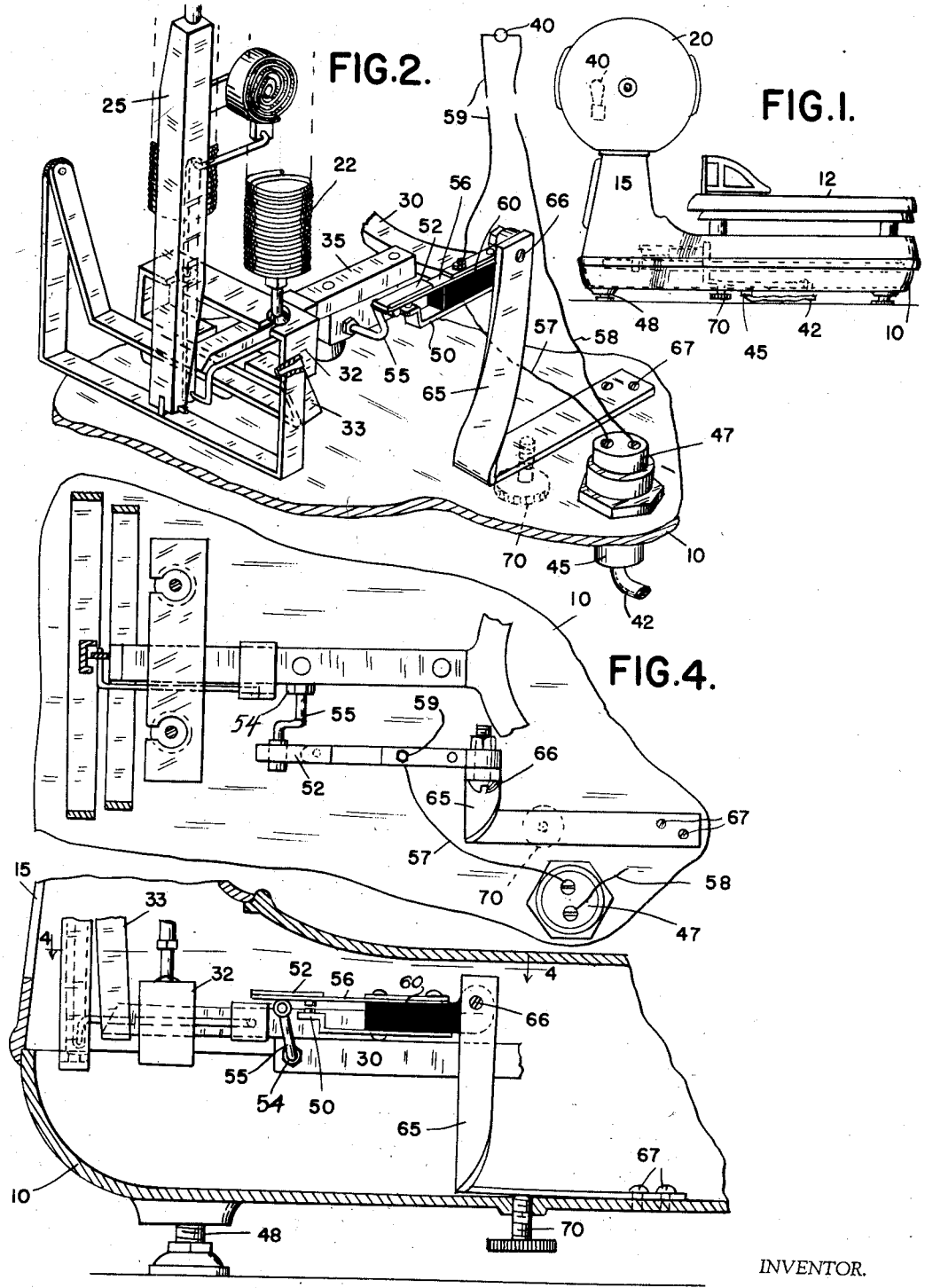
Figure 1 is a side elevational view of a scale provided with switching means constructed in accordance with the principles of this invention.
Figure 2 is a perspective view of the switch mechanism and its operating means and other adjacent parts of the scale mechanism.
Figure 3 is a vertical sectional view taken through that portion of the scale housing which contains the switching means, showing the latter and adjacent parts of the scale in side elevation.
Figure 4 is a horizontal sectional plan view taken substantially on the line 4—4 of Figure 3 and looking in the direction of the arrows.

Referring now to the drawing, reference character 10 designates the hollow base of a scale of the cylindrical chart computing type, which, as shown in Figure 1, may be arranged in the manner now regarded as more or less conventional, the load receiving platform 12 being disposed above the base, while from the rear of the base rises a column 15, which supports the chart housing 20 and also encloses the counterbalancing springs 22, the rack rod 25 and other portions of the mechanism. The main lever 30 is housed within the base 10 and at its rear or nose extremity is connected to the springs and the rack rod by means, generally designated 32, 33 and not necessary herein to be particularly described, inasmuch as it forms no part of the present invention.

Needless to say, the deflection of the main lever 30, and of the nose iron 35 carried thereby, is proportional to the loading of the scale.

Chart illuminating means is provided in the form of an electric light bulb 40 which is adapted to be connected to a suitable source of electric current (not shown), as by means of the service cord 42, connectible to the scale by means of a plug 45 engageable in a socket or other receptacle 47 mounted in the base of the scale upon its under side. It will be seen that the bottom of the scale base is elevated above its support by legs 48. In series with the light 40 and the service cord 42 through which the current is supplied is a switching device comprising a stationary contact arm 50 and a movable contact arm 52, the latter operated by movement of the scale beam, from the end of which an arm 55 projects in such position that when the scale is unloaded, it lifts movable contact 52 free of the stationary contact 50, to break the circuit, while upon loading of the scale, the arm 55, falling with the nose of the lever, allows the movable contact to drop to engagement with the stationary contact to complete the circuit. The hinging means for the movable contact may comprise a thin leaf or strap of sheet metal as 56 by which it is supported from an insulating body 60, which also carries the stationary contact 50. One of the leads as 57 from the socket 47 is connected to the stationary contact, while the other lead 58 from such socket is connected directly to the light 40, as also is the lead 59 from the movable switch contact arm 52.

The switch is secured to a supporting bracket 65 upstanding from and within the base of the scale. The holding means for the switch body comprises a screw 66 which, when tightened, holds it firmly in place, while when the screw is loosened, the switch may be swung bodily upwardly or downwardly thereabout, to adjust the initial positioning of the movable contact, and accordingly the amount of scale loading required to actuate the switch. The support 65 will be seen to be of substantially L-shape, the bottom leg of the L extending along and generally parallel to the base, to which its free end is secured as by the screws 67. An adjusting screw 70 tapped through the bottom wall of the base (and preferably provided with a knurled head therebeneath by which it may be conveniently turned) bears against the bottom of the support 65 to enable flexure thereof for adjustment. The horizontal leg of the L-bracket 65 tends to lie flat along the base, while turning the screw flexes it upwardly or allows it to move downward toward the base, as the case may be, thereby moving and adjusting the initial separation of the contacts 50, 52.

The switch actuating arm 55 is offset upwardly, being threaded into the side of the nose of the lever and locked by a jam nut 54. Loosening the nut allows turning the arm to adjust its position. It will thus be seen that all elements of the switching apparatus are easily adjustable.

While it will be apparent that the illustrated embodiment of the invention herein disclosed is well calculated to adequately fulfill the objects and advantages primarily stated, it is to be understood that the invention is susceptible to variation, modification and change within the spirit and scope of the subjoined claim.

What I claim is:

In a weighing scale, in combination with a casing and an element therewithin which is deflected in response and proportionally to loading of the scale, electrically operable illuminating means for the scale, switching means within the casing for controlling said illuminating means, said switching means including a switch member normally urged toward closed position and held out of said closed position by said element when the scale is unloaded, said element moving out of obstructing position to allow said switch member to close in response to loading of the scale, means carried by the casing and supporting said switch member therewith, comprising a relatively heavy strap metal member having a flexible portion secured at its one end to the casing and extending substantially parallel thereto, and having another portion extending at an angle to the casing and supporting said switch member, and thumb screw means operable from outside the casing and engaging said parallel portion between the switch means and the point of securance of said strap metal member to the casing, whereby said flexible portion may be distorted to adjust the initial position of the switch means.

MODESTE J. LACHANCE.